United States Patent [19]

Heineke et al.

[11] Patent Number: 5,882,619
[45] Date of Patent: Mar. 16, 1999

[54] PREPARATION OF A HYDROGENATION CATALYST USING $M(OR)_M X_N$

[75] Inventors: Daniel Heineke; Karsten Eller; Heinz-Walter Schneider, all of Ludwigshafen; Alfred Thome, Speyer, all of Germany

[73] Assignee: BASF Aktiengesellschaft, Ludwigshafen, Germany

[21] Appl. No.: 756,477

[22] Filed: Nov. 26, 1996

[30] Foreign Application Priority Data

Nov. 29, 1995 [DE] Germany ............... 195 44 403.5

[51] Int. Cl.[6] ............... C01B 21/20; B01J 21/18; B01J 23/42; B01J 20/34
[52] U.S. Cl. ............... 423/387; 423/388; 502/24; 502/180; 502/185
[58] Field of Search ............... 502/180, 185, 502/24; 423/387, 388

[56] References Cited

U.S. PATENT DOCUMENTS

| | | | |
|---|---|---|---|
| 3,696,157 | 10/1972 | Schneider | 260/666 |
| 4,482,643 | 11/1984 | Harju et al. | 502/242 |
| 4,656,153 | 4/1987 | Wennerberg | 502/182 |
| 4,659,683 | 4/1987 | Biffar et al. | 502/185 |
| 4,732,883 | 3/1988 | Lyons et al. | 502/185 |
| 4,889,704 | 12/1989 | Fuchs et al. | 423/387 |
| 5,120,699 | 6/1992 | Weiss et al. | 502/185 |
| 5,143,872 | 9/1992 | Weiss et al. | 423/387 |
| 5,155,081 | 10/1992 | Steigleiter et al. | 502/185 |
| 5,236,685 | 8/1993 | Fuchs et al. | 423/387 |

FOREIGN PATENT DOCUMENTS

| | | | |
|---|---|---|---|
| 3718352 | 12/1988 | Germany | 502/24 |
| 187739 | 10/1966 | Russian Federation | 502/24 |
| 772 693 | 4/1957 | United Kingdom . | |

OTHER PUBLICATIONS

*J. of Mol. Catalysts,* 74, 1992, pp. 323–333.
*Revue de l'Institute Francais Du Petrole,* vol. 46, No. 2, Mar.–Apr. 1991.

*Primary Examiner*—Wayne Langel
*Attorney, Agent, or Firm*—Keil & Weinkauf

[57] ABSTRACT

A carbon-containing catalyst support is prepared by treating the carbon-containing catalyst support with a compound of the formula I $$M(OR)_m X_n \qquad \qquad I$$

where M is Ti or Zr, X is Cl or Br, and R is $C_1$–$C_{20}$-alkyl, and m and n are integers from zero to four, where the sum of m and n is equal to four.

4 Claims, No Drawings

PREPARATION OF A HYDROGENATION CATALYST USING M(OR)$_M$X$_N$

The present invention relates to a process for the preparation of a carbon-containing catalyst support.

The present invention furthermore relates to a carbon-containing catalyst support, to a method of using a compound of the formula I, M(OR)$_m$X$_n$, to a process for the preparation of a hydrogenation catalyst, to a hydrogenation catalyst, to a method of using a novel carbon-containing catalyst support for the preparation of a hydrogenation catalyst, to a method of using a novel hydrogenation catalyst for the preparation of hydroxylammonium salts, to a process for the preparation of hydroxylammonium salts, and to a process for regenerating a platinum-containing hydrogenation catalyst.

Organic and inorganic compounds can be hydrogenated using noble metals, such as palladium, platinum or ruthenium, on various supports, such as silicon dioxide, aluminum oxide, graphite or activated charcoal, as disclosed in "Katalytische Hydrierungen im organisch chemischen Laboratorium", F. Zimalkowski, Ferdinand Enke Verlag, Stuttgart (1965).

The essential factor for the activity of these catalysts is the fine dispersion of the noble metal on the catalyst support. A practical disadvantage is the fact (see "Structure of Metallic Catalysts", J. R. Anderson, Academic Press (1975), pages 164ff) that the particle size of the applied noble metal increases under reaction conditions owing to agglomeration, the dispersion decreases, and the elemental noble metal is detached from the support material.

DE-C 40 22 853 describes that the selectivity for hydroxylamine in the hydrogenation of nitrogen monoxide can be increased by using platinum/graphite support catalysts having a graphite particle size of from 1 to 600 μm.

German Patent 956 038 has already disclosed platinum/graphite support catalysts which are obtained by precipitating platinum onto suspended graphite supports, if necessary with addition of poisons, such as compounds of sulfur, selenium, arsenic or tellurium. Such catalysts are suitable for the catalytic hydrogenation of nitrogen monoxide. These catalysts have the disadvantage that the reactivity and selectivity drop rapidly on extended use.

DE-C 40 22 851 describes that the selectivity in the preparation of hydroxylamine by hydrogenation of nitrogen monoxide in the presence of platinum/graphite supported catalysts depends on the apparent density, the compressive strength and porosity of the graphite support.

The catalysts used in the processes of the German Patents mentioned above have the disadvantage that only relatively short catalyst service lives can be achieved owing to agglomeration of the active components.

It is known that some ceramic oxides undergo very strong interactions with noble metals, such as platinum, palladium or rhodium. This effect is disclosed in the literature as SMSI (strong metal support interaction) (see, for example, A. Rochefort and F. Le Peltier, Revue de l'Institut francais du pétrole, Vol. 46, No. 2, March–April 1991). This effect is particularly pronounced in the case of TiO$_2$ and Pt. The strong interaction of the platinum with the support hinders detachment of the noble-metal component.

The interaction of transition metals with carbon-containing supports is significantly weaker than with ceramic oxides. However, application of Ti(0) to activated charcoal followed by oxidation to give TiO$_2$ allows the surface of the activated charcoal to be modified in such a way that a strong interaction takes place between the support and the noble metal, as demonstrated by Bönnemann (J. Mol. Catal. 74 (1992) 323–333). However, the application of the Ti(0) requires the prior, complex preparation of a (C$_6$H$_6$)$_2$Ti complex under an inert-gas atmosphere followed by application of the noble-metal component to the pretreated support in the form of a sol.

It is an object of the present invention to provide an improved process for the preparation of hydrogenation catalysts which is less complex than the processes known hitherto. In particular, it is an object of the present invention to prepare platinum-containing hydrogenation catalysts for the preparation of hydroxylammonium salts in which catalysts platinum has been applied in such a stable manner that extended service lives of the hydrogenation catalysts used are guaranteed, with at least the same selectivity and a high space-time yield. A further aim was to reduce the formation of byproducts.

We have found that this object is achieved by an improved process for the preparation of a carbon-containing catalyst support in which the carbon-containing catalyst support is treated with a compound of the formula I $$M(OR)_mX_n \qquad \qquad I$$

where M is Ti or Zr, X is Cl or Br, and R is C$_1$–C$_{20}$-alkyl, and m and n are integers from zero to four, where the sum of m and n is equal to four.

Also provided are a carbon-containing catalyst support, a method of using a compound of the formula I, M(OR)$_m$X$_n$, a process for the preparation of a hydrogenation catalyst, a hydrogenation catalyst, a method of using a novel catalyst support for the preparation of a hydrogenation catalyst, a method of using novel hydrogenation catalyst for the preparation of hydroxylammonium salts, a process for the preparation of hydroxylammonium salts, and a process for regenerating a platinum-containing hydrogenation catalyst.

The novel preparation of the carbon-containing catalyst support is carried out by treating a carbon-containing catalyst support with a compound of the formula I $$M(OR)_mX_n \qquad \qquad I$$

where M is titanium or zirconium, preferably titanium, X is Cl or Br, preferably chlorine, R is C$_1$–C$_{20}$-alkyl, in particular C$_1$–C$_4$-alkyl, such as methyl, ethyl, n- or i-propyl, n-, i-, sec-or tert-butyl, particularly preferably i-propyl or n-butyl, and m and n are integers from zero to four, where the sum of m and n is equal to four; preferably, m is four and n is zero or m is zero and n is four.

According to observations hitherto, the procedure described can also be applied to other metal alkoxides or metal halides, such as Si(OR)$_4$, Al(OR)$_3$, AlCl$_3$ or SiCl$_4$, but this usually results in a weaker SMSI than in the case of the compounds claimed.

According to observations hitherto, particularly preferred compounds of the formula I have proven to be Ti(O-i-Pr)$_4$, Ti(O-n-Bu)$_4$ and TiCl$_4$.

Suitable carbon-containing catalyst supports are generally suspended graphite or activated charcoal, in particular electrographite materials, particularly preferably electrographite materials having a particle size in the range from 0.5 to 600 μm, in particular from 2 to 50 μm.

The treatment of the carbon-containing catalyst support is preferably carried out in anhydrous solvents, for example in alcohols, preferably C$_1$–C$_6$-alkanols, such as methanol, ethanol, n-or i-propanol, n-, i-, sec- or tert-butanol, n-pentanol or n-hexanol, in particular in n-butanol.

The catalyst support is usually treated with the compound of the formula I at from 0° to 100° C., preferably at from 10° to 50° C., and a pressure in the range from 1 to 1000 kPa, preferably from 50 to 200 kPa.

If titanium or zirconium halides or alkoxides which are partially substituted by halogen are employed in an alcoholic solvent, an alcoholysis or transesterification reaction of the alcohol serving as solvent with halide or alkoxide ligands of the titanium can take place. Likewise, the corresponding titanium compound can react with the functional oxygen-containing groups of the carbon-containing support in the desired manner, observations hitherto suggesting that the titanium is anchored to the supports The reaction is generally terminated by adding a small amount of water (quenching); usually in a water:compound of the formula I molar ratio of from 1000:1 to 2:1, preferably from 100:1 to 4:1. The carbon-containing support is subsequently filtered off, washed and dried.

According to Bönnemann (see above), only titanium compounds with a low valency state are suitable for the preparation of titanium-doped carbon-containing catalyst supports. The use of the compounds of the formula I for the preparation of carbon-containing catalyst supports was therefore unexpected.

The novel hydrogenation catalysts are prepared by precipitating platinum in an aqueous medium onto a carbon-containing catalyst support, if desired after partial poisoning by sulfur-, arsenic-, tellurium- or antimony-containing compounds, using a reducing agent, where a carbon-containing catalyst support is employed which has been treated with a compound of the formula I.

The novel carbon-containing catalyst support or a catalyst support prepared by the novel process can therefore be employed for the preparation of a platinum-containing hydrogenation catalyst.

In this preparation, a platinum(IV) compound is usually reduced in a manner known per se (for example by the process described in DE-C 40 22 853) in aqueous solution in the presence of the carbon-containing catalyst support treated in accordance with the invention, to give platinum (0).

Agents for partial poisoning of the catalyst are advantageously added before the reduction to platinum(0) and after the solution has been buffered with an alkali metal acetate, such as sodium acetate or potassium acetate.

If the poison used is a compound which is capable of reducing platinum(IV) to platinum(II) (for example Blankit), the reduction is advantageously carried out initially as far as the platinum(II) stage. The end point of this reaction is generally evident from the considerable change in the potential which can be measured during the reduction. The partial poisoning is then usually carried out by adding a certain amount beyond that required for reduction of the platinum(IV) to platinum(II). This is generally followed by the reductive precipitation of the platinum onto the pre-treated graphite support using reducing agents which reduce platinum to metallic platinum. Examples of suitable reducing agents are hydrazine, formaldehyde, formic acid and alkali metal formates, such as sodium formate.

If the poison used is a compound which is not capable of reducing platinum(IV) to platinum(II), platinum(IV) can generally be reduced directly to platinum(0) using one of the abovementioned reducing agents.

Particularly suitable platinum(IV) compounds are anhydrous compounds such as hexachloroplatinic acid and alkali metal and ammonium salts thereof.

The platinum:reducing agent molar ratio is usually from 1000:1 to 10:1, preferably from 100:1 to 20:1.

The carbon-containing support used is generally suspended graphite or activated charcoal, in particular electrographite materials, particularly preferably electrographite materials having a particle size in the range from 0.5 to 600 $\mu$m, preferably from 2 to 50 $\mu$m. The amount of platinum is generally from 0.2 to 2% by weight, preferably from 0.5 to 1% by weight, based on the total weight of platinum/graphite support catalyst.

The reduction of the platinum is generally carried out in an aqueous solution; generally with a water:platinum ratio by weight of from 1000:1 to 100:1, preferably from 500:1 to 100:1.

The reduction is furthermore preferably carried out in the slightly acidic to neutral pH range, usually at from 4.5 to 7, preferably from 5 to 6. The pH is generally set by addition of buffer salts, such as alkali metal acetate, in particular sodium acetate.

In a preferred embodiment, the reducing agent used is sodium dithionite, and just sufficient sodium dithionite is added so that the solution potential, measured using a glass electrode, is in the range from 420 to 500 mV, preferably from 440 to 480 mV. When the platinum(IV) has been reduced to platinum(II), which is generally evident from a considerable change in the potential, an amount of sodium dithionite beyond that required for the reduction of the platinum(IV) to platinum(II) is generally added until a certain potential has been reached. This potential characterizes the state of poisoning of the catalyst and is usually in the range from 200 to 440 mV, preferably from 270 to 340 mV.

In a further preferred embodiment, the catalyst is partially poisoned, without prior reduction of the platinum(IV) to platinum(II), by adding a conventional poison based on sulfur, selenium, arsenic or tellurium, such as elemental sulfur, sodium dithionite, alkali metal thiosulfates, hydrogen sulfide, alkali metal sulfide, alkali metal polysulfide, thiourea, telluric acid or arsenic acid, or mixtures thereof.

The molar ratio between platinum and the sulfur, selenium, arsenic or tellurium poison is usually selected to be in the range from 20:1 to 3:1, preferably from 10:1 to 5:1.

The partial poisoning is usually carried out by methods known per se, as described, for example, in DE-C 40 22 853.

The partial poisoning, if carried out, is followed by reduction to metallic platinum.

The molar ratio between reducing agent and platinum is generally selected to be an the range from 1000:1 to 10:1, preferably from 100:1 to 20:1.

The temperature during the reduction is generally selected to be in the range from 50° to 95° C., preferably from 60° to 90° C.

Furthermore, the reduction is expediently carried out under atmospheric pressure.

When the reduction is complete, the catalyst is generally worked up in a conventional manner, for example by filtering it off from the reaction mixture and expediently washing it with water.

The catalysts obtained by the novel process are, according to observations hitherto, suitable for the hydrogenation of both organic and inorganic compounds.

The novel catalysts are preferably employed for the hydrogenation of olefinically or acetylenically unsaturated compounds, and furthermore for the hydrogenation of carboxylic acids, aldehydes or ketones to the corresponding alcohols or of nitriles to the corresponding amines. The novel catalysts are furthermore suitable for the hydrogenation of inorganic substances, such as oxygen, but in particular for the preparation of hydroxylammonium salts by hydrogenation of nitrogen monoxide in aqueous mineral acids.

The novel hydrogenation catalyst or the hydrogenation catalyst prepared in accordance with the invention can be used for the preparation of hydroxylammonium salts.

A process has also been found for the preparation of hydroxylammonium salts by reduction of nitrogen monoxide using hydrogen in the presence of a hydrogenation catalyst, where the hydrogenation catalyst employed is a novel hydrogenation catalyst or a hydrogenation catalyst prepared in accordance with the invention.

In the preparation of hydroxylammonium salts, a hydrogen:nitrogen monoxide molar ratio of from 1.5:1 to 6:1, preferably from 3.5 to 5:1, is generally maintained. Particularly good results are obtained, according to observations hitherto, when it is ensured that a hydrogen:nitrogen monoxide molar ratio of from 3.5:1 to 5:1 is maintained in the reaction zone.

The acids used are advantageously strong mineral acids, such as nitric acid, sulfuric acid or phosphoric acid, or aliphatic $C_1$–$C_5$-monocarboxylic acids, such as formic, acetic, propionic, butyric or valeric acid, preferably formic acid or acetic acid. Also suitable are, inter alia, acidic salts, such as ammonium bisulfate. In general, aqueous acids with a normality of from 4 to 6 are used, and the acid concentration is usually not allowed to drop below 0.2 normal during the reaction.

The hydrogenation of nitrogen monoxide is generally carried out at from 30° to 80° C., preferably from 35° to 60° C. Furthermore, the pressure during the hydrogenation is usually selected to be in the range from 1 to 30 bar, preferably from 1 to 20 bar (absolute).

The mineral acid:catalyst ratio is generally selected to be in the range from 1 to 100 g, preferably from 30 to 80 g, of platinum/graphite catalyst per liter of mineral acid.

In a further preferred embodiment, in particular in the preparation of hydroxylammonium salts, the catalyst is treated with hydrogen ("activation"), before the hydrogenation, in acidic solution, expediently in the mineral acid in which the hydrogenation is to be carried out.

Furthermore, a process has also been found for regenerating a platinum-containing hydrogenation catalyst, in which the platinum is applied to a carbon-containing catalyst support, which process can be carried out in a manner known per se by using, as carbon-containing catalyst support, a novel catalyst support or a catalyst support prepared in accordance with the invention.

To this end, the platinum component of the catalyst is usually dissolved by means of an acid or acid mixture, and any insoluble constituents are separated off. The resultant platinum salt solution is subsequently neutralized, and the platinum salt is then treated by the novel process.

According to observations hitherto, the novel catalysts are superior to known catalysts for the same purpose with respect to selectivity and service life. The novel process for the preparation and regeneration of hydrogenation catalysts has the advantage over known processes of being simpler to carry out and at the same time of reducing the amount of waste products.

EXAMPLES

The particle size was determined using a MALVERN Mastersizer (see also Verfahrenstechnik 24 (1990) p. 36ff). The Fraunhofer diffraction was measured at a wavelength of 633 nm. By choosing a supplementary lens having a focal length of f=300 nm, the particle size distribution was determined in the range from 1 to 600 $\mu$m.

For the measurement, a spatula tip of the powder to be analyzed was added to one liter of a 0.1% strength by weight aqueous Nekanil® 910 solution (BASF AG; Nekanil® 910 is a nonylphenol which has been reacted with 9 to 10 mol of ethylene oxide; properties: water-clear, viscous liquid; nonionic, density at 20° C.: 1.04 g/cm$^3$; pour point: below −10° C.; pH of a 1% strength by weight solution: 6.5 to 8.5). Before the measurement, the resultant mixture to be analyzed was subjected to ultrasound treatment for 1 min.

In order to determine the specific platinum surface area, the novel carbon-containing, Ti-doped catalysts were analyzed by H2 pulse chemisorption (Pulse Chemisorb 2700, 35° C.). In order to prepare the samples, the material to be analyzed was first treated with hydrogen (30 ml/min) at 200° C. for 30 minutes, and then flushed with argon (30 ml/min) at 250° C. for 30 minutes. For the analysis itself, the sample was subjected to hydrogen pulses (200 $\mu$l per pulse) at a flow rate of 16 ml/min at 35° C. until the sample was unable to take up any further hydrogen.

The control samples used were two graphite supports (prepared analogously to Example 1 [Becker-Pennrich] or Example 2 [Asbury]) without platinum, but treated in accordance with the invention with a compound of the formula I:
a) in the case of graphite (Becker-Pennrich) having a particle size in the range from 28 to 50 $\mu$m, without Pt, with 0.064% by weight of Ti, based on the total support material, the hydrogen adsorption was below the detection limit (about 0.2 $\mu$mol/g for the indicated amount of sample);
b) in the case of graphite (Asbury graphite) having a particle size in the range from 2 to 50 $\mu$m, without Pt, with 0.064% by weight of Ti, based on the total support material, the hydrogen adsorption was below the detection limit.

Example 1

45 g of graphite having a particle size from 28 to 50 $\mu$m were suspended in 100 ml of dry n-butanol. 0.16 g of Ti(O-i-$C_3H_7$)$_4$ were added to the suspension, and the mixture was stirred for 2 days. After this time, 0.1 ml of bidistilled water was added, and the mixture was stirred for a further 1 hour. The coated graphite was filtered off and dried for 12 hours at 110° C. under $N_2$. Analysis showed a Ti content of 0.064% (theoretical: 0.08%).

40 g of the graphite pretreated with titanium and having a particle size of from 28 to 50 $\mu$m and 0.5310 g of hexachloroplatinic(IV) acid 6-hydrate were stirred overnight at 8° C. with 40 ml of an aqueous solution containing 3.87 ml of concentrated hydrochloric acid and 0.87 ml of concentrated nitric acid. The resultant suspension was treated with sodium carbonate until a pH of 2.75 had been reached. 2.5 g of sodium acetate were subsequently added to provide buffering. 2.5 mg of elemental sulfur were then added, and, after about 1 minute, the platinum was precipitated by adding 14 g of a 40% strength by weight sodium formate solution (5.63 g of sodium formate, an approximately 81-fold excess based on platinum). The solution was stirred at 80° C. for a further 2 hours. After this time, platinum was no longer detectable by means of hydrazine hydrate (gives a black precipitate in alkaline solution in the presence of platinum).

The catalyst prepared in this way was separated off from the reaction mixture by filtration through a glass frit and washed with distilled water until the pH of the washings was no longer in the acidic region. The dried catalyst contained 0.5% by weight of platinum.

The platinum surface was determined by pulse chemisorption. To this end, the catalyst sample was pretreated for 30 minutes at 200° C. under a hydrogen stream and for 30 minutes under an argon stream, in each case at a flow rate of 30 ml/min. $H_2$ pulse chemisorption gave a hydrogen adsorption of 2.4 (±0.1) $\mu$mol/g, corresponding to a dispersion of 18.5±0.5%.

b) 4.8 g of the catalyst prepared under a) were suspended in 120 ml of 4.3N sulfuric acid, and 7.75 l/h of a mixture of 35% by volume of nitrogen monoxide and 65% by volume of hydrogen were passed into the suspension at 40° C. with vigorous stirring (3500 rpm). After 4 hours, the catalyst was separated off, and the liquid phase was analyzed. The catalyst was subsequently mixed with 120 ml of 4.3N sulfuric acid, and the reaction was continued. This process was repeated every 4 hours. The reaction was terminated when the selectivity to dinitrogen monoxide exceeded the set upper limit of 10%. The experimental results are shown in the table below.

Comparative Example 1

The process was similar to that in Example 1, with the differences that untreated graphite having a particle size of from 28 to 50 μm was used, and 6 mg of elemental sulfur were added for poisoning. The dried catalyst contained 0.5% by weight of platinum.

$H_2$ pulse chemisorption gave a hydrogen adsorption of 0.3 (±0.1) μmol/g, corresponding to a dispersion of 2±0.5%. The results achieved are shown in the table below, showing that the novel treatment of the carbon-containing support drastically increased the available platinum surface area (cf. Example 1a).

Example 2

45 g of graphite (from Asbury) having a particle size from 2 to 50 μm were suspended in 100 ml of dry n-butanol. 0.16 g of $TiCl_4$ were added to the suspension, and the mixture was stirred for 2 days. After this time, 0.1 ml of bidistilled water was added, and the mixture was stirred for a further 1 hour. The coated graphite was filtered off and dried for 12 hours at 110° C. under $N_2$. Analysis showed a Ti content of 0.065% (theoretical: 0.06%).

40 g of the graphite pretreated with titanium and having a particle size of from 2 to 50 μm and 0.5310 g of hexachloroplatinic(IV) acid 6-hydrate were stirred overnight at 80° C. with 40 ml of an aqueous solution containing 3.87 ml of concentrated hydrochloric acid and 0.87 ml of concentrated nitric acid. The resultant suspension was treated with sodium carbonate until a pH of 2.75 had been reached. 2.5 g of sodium acetate were subsequently added to provide buffering. 6 mg of elemental sulfur ere then added, and, after about 1 minute, the platinum was precipitated by adding 14 g of a 40% strength by weight sodium formate solution (5.63 g of sodium formate, an approximately 81-fold excess based on platinum). The solution was stirred at 80° C. for a further 2 hours. After this time, platinum was no longer detectable by means of hydrazine hydrate (gives a black recipitate in alkaline solution in the presence of platinum).

The catalyst prepared in this way was separated off from the reaction mixture by filtration through a glass frit and washed with distilled water until the pH of the washings was no longer in the acidic region. The dried catalyst contained 0.5% by weight of platinum.

b) 4.8 g of the catalyst prepared under a) were suspended in 120 ml of 4.3N sulfuric acid, and 7.75 l/h of a mixture of 35% by volume of nitrogen monoxide and 65% by volume of hydrogen were passed into the suspension at 40° C. with vigorous stirring (3500 rpm). After 4 hours, the catalyst was separated off, and the liquid phase was analyzed. The catalyst was subsequently mixed with 120 ml of 4.3N sulfuric acid, and the reaction was continued. This process was repeated every 4 hours. The reaction was terminated after 50 batches. The experimental results are shown in the table below.

Comparative Example 2

The procedure was similar to that in Example 2, with the differences that untreated graphite having a particle size of from 2 to 50 μm was used and 5 mg of elemental sulfur were added for poisoning. The results achieved are shown in the table below.

TABLE

| | Example 1 | Comparative 1 | 2 | Comparative 2 |
|---|---|---|---|---|
| Number of cycles | 19 | 12 | 50 | 50 |
| Selectivity to $NH_2OH$ [%] | 86.77 | 86.36 | 91.96 | 89.90 |
| Selectivity to $NH_3$ [%] | 10.64 | 8.02 | 6.66 | 9.34 |
| Selectivity to $N_2O$ [%] | 2.58 | 5.62 | 1.38 | 0.76 |
| NO conversion [%] | 91.12 | 90.27 | 96.64 | 95.87 |
| Space-time yield [mol of $NH_2OH/l$ of $H_2SO_4 \cdot h$] | 0.798 | 0.788 | 0.897 | 0.870 |

It can be seen from the table that the service life of the catalyst from Example 1 is significantly longer than that of the comparative catalyst (19 vs. 12 cycles).

The catalyst from Example 2 gives, for the same service life of 50 cycles, a significantly higher HA selectivity and an improved space-time yield than the catalyst from Comparative Example 2.

(Owing to the different particle size distribution, the results from Example 1 and Example 2 can only be compared with Comparative Example 1 and Comparative Example 2 respectively).

We claim:

1. A process for the preparation of a carbon-containing catalyst support, which comprises treating the carbon-containing catalyst support with a compound of the formula I $$M(OR)_m X_n \qquad \qquad I$$

where M is Ti or Zr, X is Cl or Br, and R is $C_1-C_{20}$-alkyl, and m and n are integers from zero to four, and where the sum of m and n is equal to four.

2. A carbon-containing catalyst support prepared by a process as claimed in claim 1.

3. A process for regenerating a platinum-containing hydrogenation catalyst, where the platinum has been applied to a carbon-containing catalyst support, wherein the carbon-containing catalyst support is prepared as claimed in claim 1, which comprises treating the catalyst with an acid or acid mixture whereby the platinum is dissolved to form a platinum salt solution, separating any insoluble constituents from the platinum salt solution, introducing the carbon-containing catalyst support into the platinum salt solution, precipitating the platinum onto the catalyst support, and recovering the regenerated platinum-containing hydrogenation catalyst.

4. A process for the preparation of hydroxylammonium salts by reducing nitrogen monoxide using hydrogen in the presence of a hydrogenation catalyst, wherein the hydrogenation catalyst employed is prepared by precipitating platinum in an aqueous medium onto a carbon-containing catalyst support, optionally after partial poisoning using sulfur-, arsenic-, tellurium- or antimony-containing compounds, using a reducing agent, which comprises treating the carbon-containing catalyst support with a compound of the formula I $$M(OR)_m X_n \qquad \qquad I$$

where is Ti or Zr, X is Cl or Br, and R is $C_1-C_{-20}$-alkyl, and m and n are integers from zero to four, and where the sum of m and n is equal to four.

* * * * *

UNITED STATES PATENT AND TRADEMARK OFFICE
CERTIFICATE OF CORRECTION

PATENT NO.: 5,882,619

DATED: March 16, 1999

INVENTOR(S): HEINEKE et al.

It is certified that error appears in the above-identified patent and that said Letters Patent is hereby corrected as shown below:

Col. 8, claim 4, line 63, after "where" insert --M--.

Signed and Sealed this

Seventeenth Day of August, 1999

Attest:

Q. TODD DICKINSON

Attesting Officer

Acting Commissioner of Patents and Trademarks